United States Patent
Kol et al.

(10) Patent No.: US 7,958,186 B2
(45) Date of Patent: Jun. 7, 2011

(54) RESTRUCTURING INTEGRATION SYSTEM

(75) Inventors: Nir Kol, Sunnyvale, CA (US); Sven Schwerin-Wenzel, Dielheim (DE); Eric Wood, Menlo Oaks, CA (US); Shai Agassi, Los Gatos, CA (US); Dennis B. Moore, Burlingame, CA (US); Ranjan Das, Foster City, CA (US)

(73) Assignee: SAP AG, Walldorf (DE)

( * ) Notice: Subject to any disclaimer, the term of this patent is extended or adjusted under 35 U.S.C. 154(b) by 1367 days.

(21) Appl. No.: 10/750,378

(22) Filed: Dec. 31, 2003

(65) Prior Publication Data

US 2004/0181795 A1    Sep. 16, 2004

Related U.S. Application Data

(60) Provisional application No. 60/455,087, filed on Mar. 14, 2003.

(51) Int. Cl.
*G06F 15/16* (2006.01)

(52) U.S. Cl. ........ 709/203; 709/217; 709/218; 709/219; 709/227; 709/228

(58) Field of Classification Search .................. 709/203, 709/217, 218, 219, 227, 228
See application file for complete search history.

(56) References Cited

U.S. PATENT DOCUMENTS

| | | | | |
|---|---|---|---|---|
| 6,631,512 B1 * | 10/2003 | Onyeabor | ...................... | 717/100 |
| 6,901,595 B2 * | 5/2005 | Mukundan et al. | ........... | 719/316 |
| 6,907,401 B1 * | 6/2005 | Vittal et al. | ...................... | 705/26 |
| 6,961,897 B1 * | 11/2005 | Peel et al. | ........................ | 715/209 |
| 7,020,697 B1 * | 3/2006 | Goodman et al. | ............ | 709/223 |
| 7,228,548 B1 * | 6/2007 | Aldrich et al. | ................. | 719/310 |
| 7,260,617 B2 * | 8/2007 | Bazinet et al. | ................. | 709/219 |
| 2002/0065701 A1 * | 5/2002 | Kim et al. | ......................... | 705/9 |
| 2002/0108099 A1 * | 8/2002 | Paclat | ........................... | 717/102 |
| 2003/0236693 A1 * | 12/2003 | Chen et al. | ....................... | 705/9 |
| 2004/0078777 A1 * | 4/2004 | Bahrami | ....................... | 717/105 |
| 2004/0167896 A1 * | 8/2004 | Eakin | .............................. | 707/10 |
| 2004/0187140 A1 * | 9/2004 | Aigner et al. | .................. | 719/328 |

OTHER PUBLICATIONS

Wireless Application Protocol White Paper, pp. 1-18, W@P Forum, Jun. 2000.*
Encapsulated PostScript File Format Specification, Version 3.0, Adobe Systems Incorporated, May 1, 1992.*

* cited by examiner

*Primary Examiner* — Rupal D Dharia
*Assistant Examiner* — Van Kim T Nguyen
(74) *Attorney, Agent, or Firm* — Buckley, Maschoff & Talwalkar LLC

(57) ABSTRACT

A system includes a portal connected to user interface (UI) components, application logic linking the UI components to a repository layer and connectivity layer through an object access layer, and source systems linked to the repository layer and the connectivity layer.

13 Claims, 5 Drawing Sheets

RESTRUCTURING INTEGRATION SYSTEM

CROSS REFERENCE TO RELATED APPLICATIONS

This application claims priority to U.S. Provisional Application entitled "ENTERPRISE CHANGE PLANNING AND EXECUTION," filed on Mar. 14, 2003, application Ser. No. 60/455,087.

FIELD OF THE INVENTION

The present invention relates to data processing by digital computer, and more particularly to a restructuring integration system.

BACKGROUND

Corporate change or restructuring activities include mergers, acquisitions, spin-offs, department mergers and splits, and so forth. For example, mergers and acquisitions involve combining two or more entities into a single entity. Each entity can include diverse business processes that need to be integrated into in the single entity in a timely and efficient fashion. The diverse business processes often include a combination of entity-specific tools, spreadsheets, electronic mail, voicemail, word processing, project management tools, and implicit knowledge of the entity's employees. Integration tools can be used to ease the transition of the multiple entities into the single entity.

SUMMARY

The present invention provides methods and apparatus, including computer program products, for corporate change or restructuring integration.

In an aspect, the invention features a system including a portal connected to user interface (UI) components, application logic linking the UI components to a repository layer and connectivity layer through an object access layer, and source systems linked to the repository layer and the connectivity layer. The system can also include input/output devices linked to the portal. The input/output devices can be web devices that communicate with the portal using Wireless Application Protocol (WAP) and Wireless Markup Language (WML) or Internet browsers that communication with the portal using Hypertext Transfer Protocol (HTTP) and Extended Markup Language (XML). The portal can serve as a common interface that receives requests from clients and generates information views in response. The information views can be web pages.

In embodiments, the UI components can include application navigation components, application integration components, and information views. The client requests can be coupled to the portal by a proxy server.

The repository layer can include a data object model, and databases including metadata and data, the data including templates. The metadata can include data pertaining to roles, work sets and personalization information, and can interact with the object access layer, the connectivity layer and the application logic. The metadata can also interact with templates, the templates providing a format of information according to preset conditions, and the templates interact with Web application server (WAS) processes and core merger processes.

The databases can interact with the source systems through base systems connectors using a markup language, with the source systems through base systems connectors using web services, and/or with the source systems through base systems connectors using TCP/IP. In embodiments, source systems can communicate with each other through a firewall.

In another aspect, the invention features an architecture including a network linked to a portal, the portal generating information views and an interface to an enterprise management system, and enterprise base systems linked to the enterprise management system, the enterprise base systems including application services and multiple types of base system data.

In embodiments the architecture can include client systems linked to the network, and/or a proxy server linking the client systems to the network.

The portal can provide a common interface through user interface (UI) components. The enterprise management system can include integrated application services to manage business objects and business processes in a business enterprise. Business objects and business processes can include personnel resources, development project resources, business program resources, inventory resources, accounts, business products and/or business services.

The application services can include human resource management systems, customer relationships management systems, financial management systems, project management systems, knowledge management systems, business warehouse systems, time management systems, electronic file systems and/or mail systems.

The enterprise management system can include a process to consolidate and integrate base system data into a single management tool. The single management tool can include systems and methods to facilitate generation of cross-functional applications that draw on resources of the enterprise base systems.

In embodiments, the enterprise base systems can reside in servers connected to a public network.

Embodiments of the invention can have one or more of the following advantages.

A single logical physically distributed information architecture represents multiple enterprise information systems of organizations including multiple clients accessing data over a network through a portal.

The portal provides a common interface to program management services through user interface (UI) components. The portal can implement a user roles-based system to personalize a common interface and generate information views (iViews) for a user.

An enterprise management system consolidates multiple application services to manage business objects and business processes in a business enterprise. Consolidation and integration of data and functionalities of enterprise base systems generate a single management tool.

The single management tool includes methods and systems to facilitate generation of new applications within the enterprise management system. These new applications are referred to as cross-functional or composite applications, and can draw on resources of the enterprise base systems to cross over traditional application boundaries and handle new business scenarios in a flexible and dynamic manner.

The details of one or more implementations of the invention are set forth in the accompanying drawings and the description below. Further features, aspects, and advantages of the invention will become apparent from the description, the drawings, and the claims.

DESCRIPTION OF DRAWINGS

Like reference numbers and designations in the various drawings indicate like elements.

DETAILED DESCRIPTION

Figure 1:
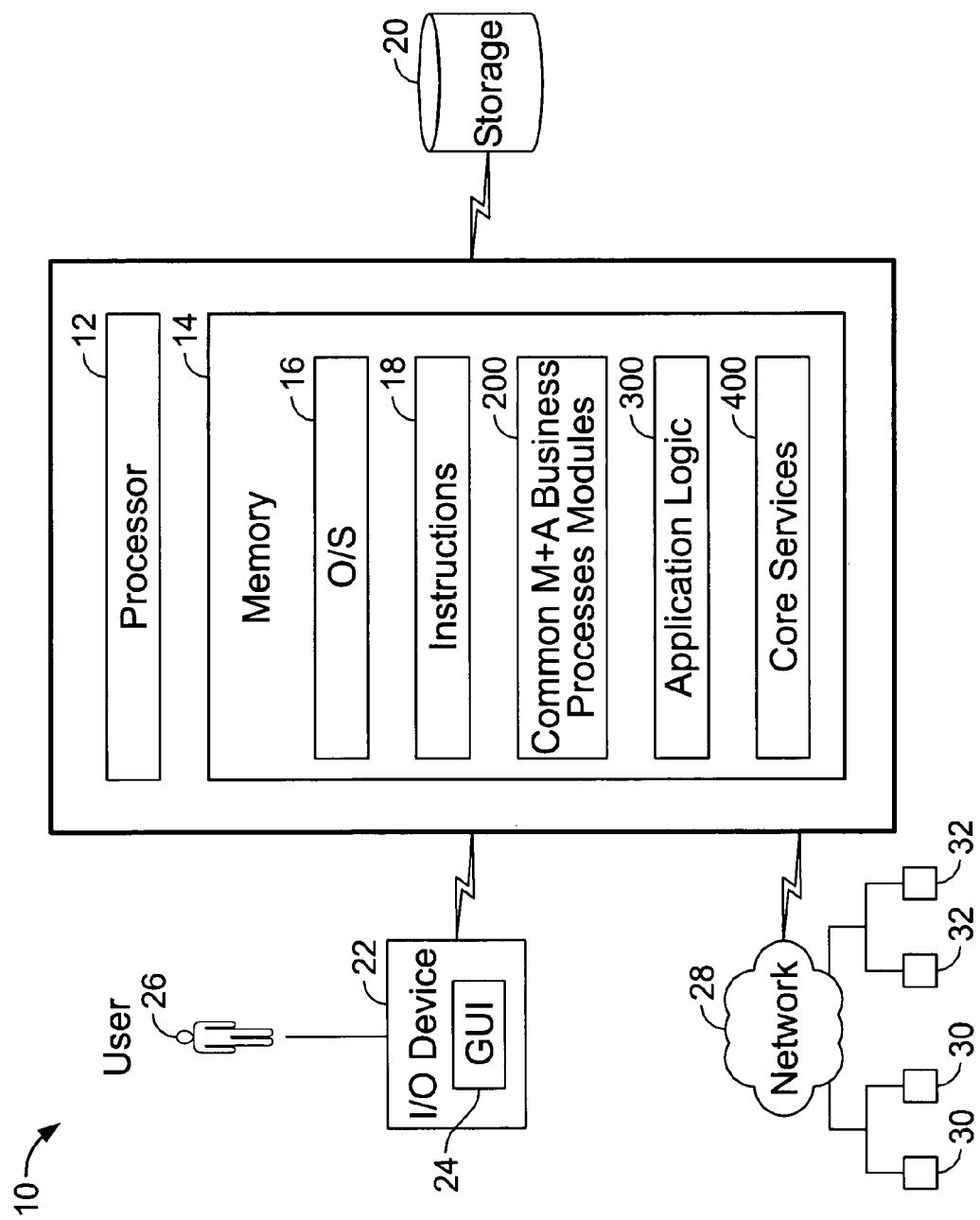
FIG. 1 is a block diagram of an exemplary system.

As shown in FIG. 1, a system 10 includes a processor 12 and a memory 14. Memory 14 includes an operating system 16, and instructions 18, that when executed by the processor 12, perform an exemplary restructuring integration process 100, described below. A specific restructuring process, referred to as a merger and acquisition (M&A), will be used as an example throughout this description. However, the process 100 can be applied to most corporate change or restructuring activities, such as spin-offs, department mergers and splits, and so forth. Memory 14 also includes common restructuring business processes modules 200, application logic 300, and a core framework of services 400 that support the restructuring integration process 100. The system 10 includes a link to a storage device 20 and an input/output device 22. The input/output device 22 can include a graphical user interface (GUI) 24 for display to a user 26.

The system 10 includes a link to a network 28. Network 28 links the system 10 to other systems 30 within a single entity and to systems 32 in one or more other entities. Systems 30, 32, generally referred to as clients or source systems, access data through a portal 34. Systems 10, 30, 32 are designed to act as a single logical physically distributed information system representing multiple enterprise information systems of organizations residing in the systems 30, 32. Information is exchanged between the system 10 and systems 30, 32 through the portal 34 and through user interfaces (UIs) of an architecture, described below.

Figure 2:
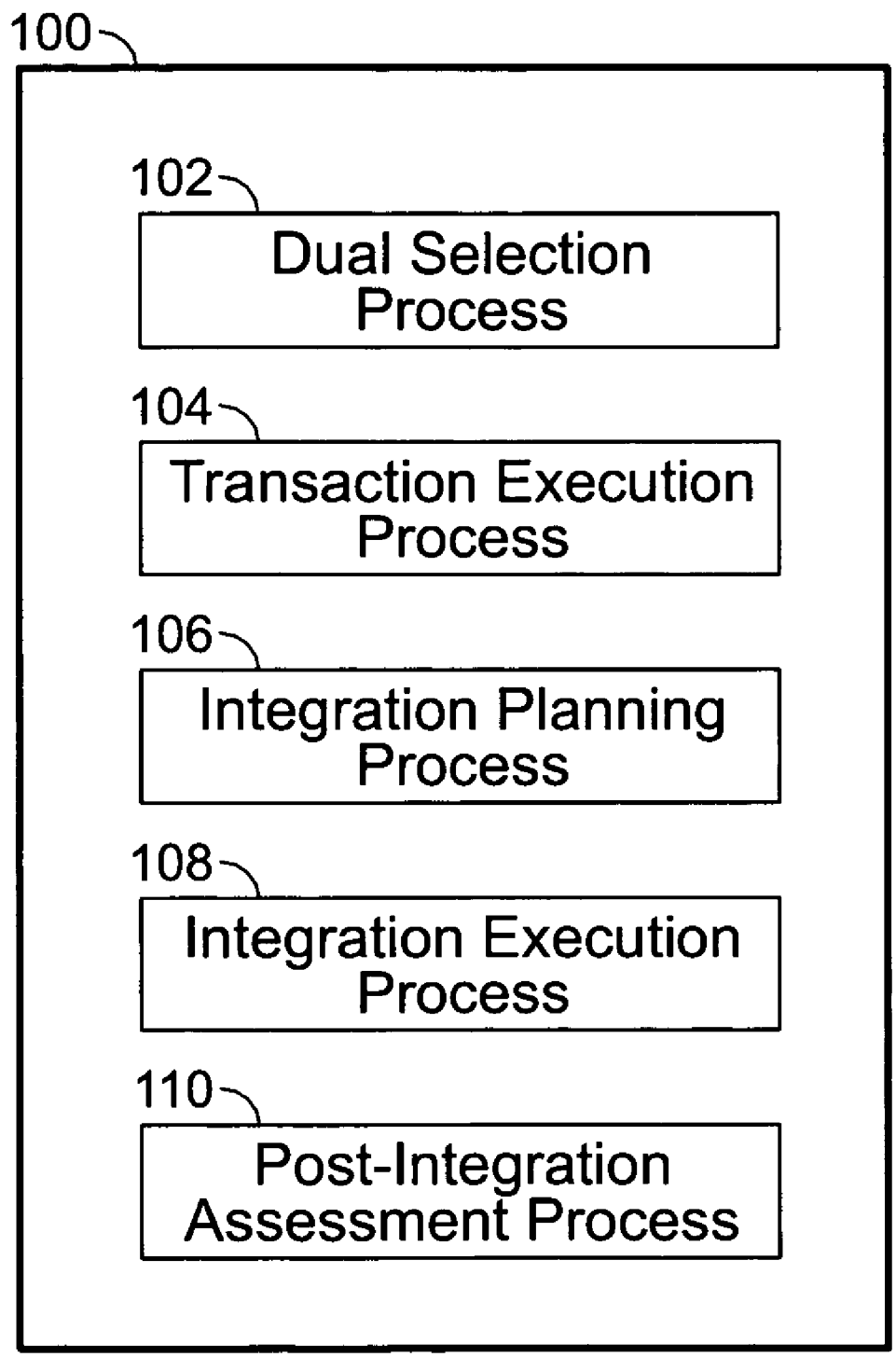
FIG. 2 is a flow diagram of a restructuring integration process.

As shown in FIG. 2, the restructuring integration process 100 includes a deal selection process 102. The deal selection process 102 defines acquisition objectives and strategies. The deal selection process 102 searches for the best fit target company to meet a set of objectives and manages detailed due diligence on the target company. The deal selection process 102 also identifies synergies, risks and a realization plan for acquiring the target company.

A transaction execution process 104 structures an acquisition in terms of type, tax implications, legal issues and so forth. The transaction execution process 104 closes an acquisition deal and provides for a rollback in the event the acquisition deal fails.

An integration planning process 106 provides a plan for short term and long term tasks of acquisition integration and communicates goals and decisions to all stakeholders.

The restructuring integration process 100 includes an integration execution process 108. The integration execution process 108 manages an integration project and it sub-projects, designs a new organization, and minimizes disruptions to customers by rolling out combined field organizations quickly. The integration execution process 108 manages the integration of information technology (IT), human resources (HR), financials and procurement. The integration execution process 108 provides for the retention of key employees, manages field organization integration, and identifies cross-selling opportunities and rolls the opportunities out. The integration execution process 108 manages stakeholders, tracks an acquisition, and reports issues and successes.

The restructuring integration process 100 includes a post-integration assessment process 110. The post-integration assessment process 110 measures achieved synergies against targets, accesses where improvements can be made in synergy estimation and/or in integration execution, and applies history to a next transaction.

Figure 3:
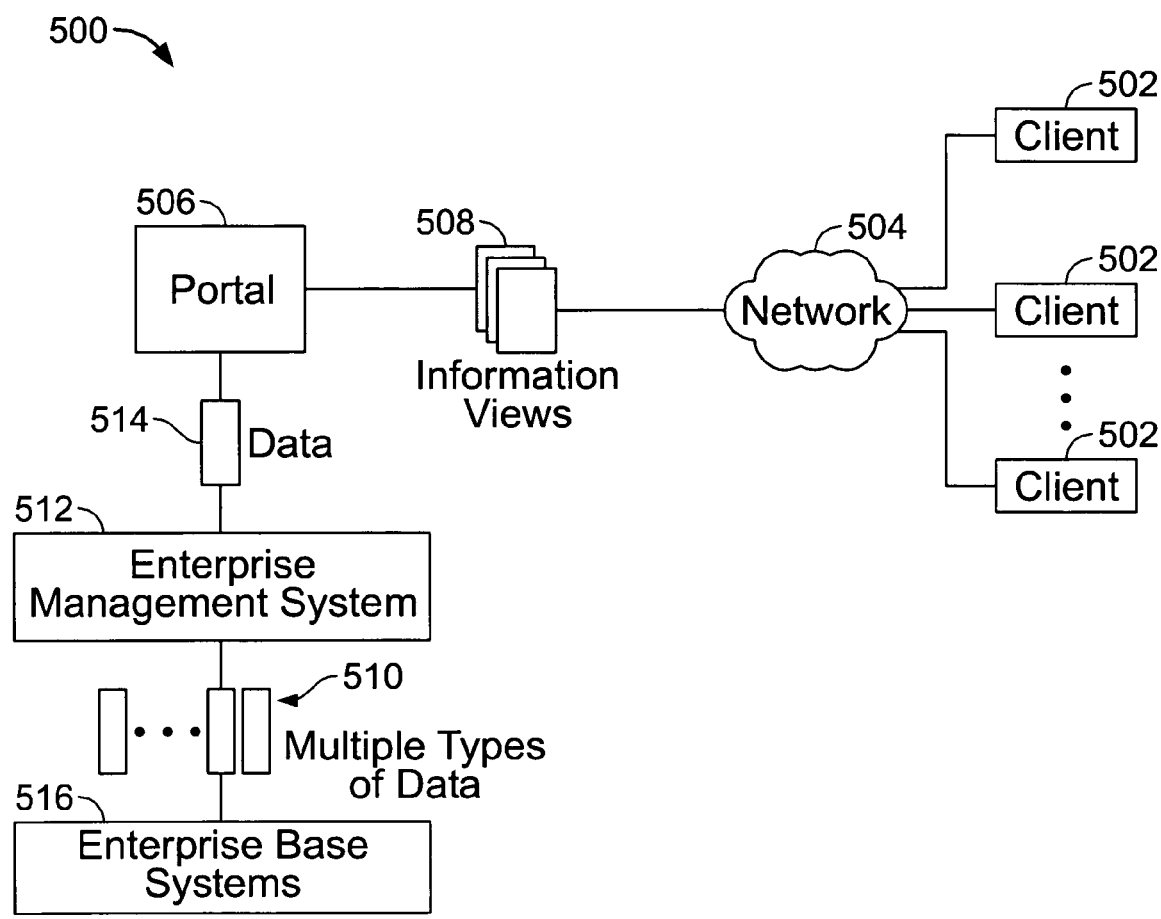
FIG. 3 is a block diagram of architecture.

As shown in FIG. 3, the restructuring integration process 100, common restructuring business processes modules 200, application logic 300, and core framework of services 400 are designed to conform to an architecture 500 designed to a platform 600 that represents a single logical physically distributed information system representing multiple enterprise information systems of organizations. The architecture 500/platform 600 insure consistency of data exchange between system 10 and source systems 30, 32, and a separation of source systems 30, 32, when appropriate during phases of the restructuring integration process 100.

The single logical physically distributed information system architecture 500 representing multiple enterprise information systems of organizations includes multiple clients 502 accessing data over a network 504 through a portal 506. In one embodiment, the clients 502 are processes and/or web browsers that are coupled to the network 504 through a proxy server (not shown).

The portal 506 provides a common interface to program management services through user interface (UI) components 508. The portal 506 receives requests from the clients 502 and generates information views (iViews) 510, such as web pages, in response. In embodiments, the portal 506 implements a user roles-based system to personalize a common interface and the iViews 510 for a user of one of the clients 502. The user can have one or more associated roles that allow personalized tailoring of a presented interface through the iViews 510.

The portal 506 communicates with an enterprise management system 512 that consolidates multiple application services.

The portal 506 receives data 514 from the system 512 to fulfill the requests of the clients 502. The system 512 provides integrated application services to manage business objects and processes in a business enterprise. The business objects and processes include resources such as personnel, development projects, business programs, inventories, clients, accounts, business products, business services and so forth.

The system 512 communicates with enterprise base systems 516 to obtain multiple types of enterprise base system data 518. The base systems 516 include application services, such as human resource management systems, customer relationship management services, financial management systems, project management systems, knowledge management systems, business warehouse systems, time management systems, electronic file systems and mail systems. In embodiments, the enterprise base systems 516 include a single integration tool, such as exchange from SAP AG of Germany, which provides an additional level of integration among the enterprise base systems 516. The enterprise management system 512 consolidates and integrates data and functionality of the enterprise base systems 516 into the single management tool.

The single management tool includes systems and methods to facilitate generation of new applications within the enterprise management system 512. The new applications, generally referred to as cross-functional or composite applications, draw on resources of the enterprise base systems 516 to cross over traditional application boundaries and handle new business scenarios in a flexible and dynamic manner.

A virtual business cycle can be generated using such composite applications, where executive level business strategy can feed management level operational planning, which in turn can feed employee level execution, which can feed management level evaluation, which can feed executive level enterprise strategy. Information generated in each of these stages in an enterprise management cycle can be consolidated and presented by the enterprise management system 512 using the customized cross-functional applications. The stages provide and consume determined services that are integrated across multiple disparate platforms.

The portal 506, enterprise management system 512 and enterprise base systems 516 can reside on one or more programmable machines, which communicate over the network 504 or one or more communication busses. In embodiments, the base systems 516 reside in multiple servers connected to the network 504, and the portal 506 and enterprise management system 512 reside in a server connected to a public network (not shown). Thus, the architecture 500 can include customized, web-based, cross-functional applications, and a user can access and manage enterprise programs and resources using these customized web-based, cross-functional applications from anywhere that access to the public network is available.

A user interface (UI) provides UI patterns used to link new objects and workflow together and generate standardized views into results generated by one or more cross-functional applications.

An object modeling tool enables generation of new business objects in a persistency/repository layer by providing a mechanism to extend a data object model dynamically according to the needs of an enterprise.

A process modeling tool enables generation of new business workflow and ad hoc collaborative workflow. The process modeling tool includes procedure templates with preconfigured work procedures that reflect best practices of achieving a work objective. A work procedure can include contributions from several individuals, generation of multiple deliverables, and milestones/phases. Whenever an instantiated business object or work procedure has a lifetime and status, a progress and status of the object or work procedure is trackable by a process owner or by involved contributors using a "dashboard" that displays highly aggregated data. The dashboard and a "myOngoingWork place" can be two UI patterns that are provided by the UI components 508.

Whenever there is a concept of "myObjects," "myRecentObjects," "myRelatedObjects" or "myPreferredObjects," then an object picker UI pattern, provided by the UI components 508, is included that lets users pick their favorite object directly. Whenever people are to be searched, either for choosing one individual person or for generating a collection of people meeting some criterion, a "People Finder" concept can be applied. A key aspect of searching for a person is described as an attribute within the user's activity, qualification, interest, and collaboration profile. For a given cross-functional application, people collections can be stored as personal or shared collections using the People Finder to make them available for further operations later on.

Whenever there is a strategic view on a cross-functional application scenario, analytics of the overall portfolio can be made available in the form of a collection of the UI components 508. A view selector is used to display/hide components, and a component can be toggled between graphical and numerical display and include a drop-down list or menu to select sub-categories or different views.

Cross-functional application scenarios provide related information to the user when possible, and some parts within a larger cross-functional application define what kind of related information is to be offered. Heuristics can be used to identify such relatedness, such as follows: (1) information that is related to the user due to explicit collaborative relationships, such as team/project membership or community membership; (2) information that is similar to a given business object in a semantic space based on text retrieval and extraction techniques; (3) recent objects/procedures of a user; (4) other people doing the same or similar activity (using the same object or procedure template, having the same work set); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Cross-functional applications also can include generic functionality in the form of "Control Center Pages" that represent generic personal resources for each user. These cross-functional applications can refer to the following pages, where appropriate: (1) A "MyOngoingWork" page that provides instant access to all dashboards that let users track their ongoing work. Ongoing work refers to the state of business objects as well as guided procedures. (2) A "MyDay" page that lists today's time based events that are assigned or related to the user. (3) "MyMessageCenter" page that displays all pushed messages and work triggers using a universal inbox paradigm with user selected categorical filters. (4) "MyInfo" that provides access to all personal information collections (documents, business objects, contacts) including those located in shared folders of teams and communities of which the user is a member. MyInfo can also provide targeted search in collaborative information spaces such as team rooms, department home pages, project resource pages, community sites, and/or personal guru pages.

The object modeling tool, process modeling tool and user interfaces are used to build components of cross-functional applications to implement new enterprise management functions without requiring detail coding development by a system architect or programmer.

Figure 4A:
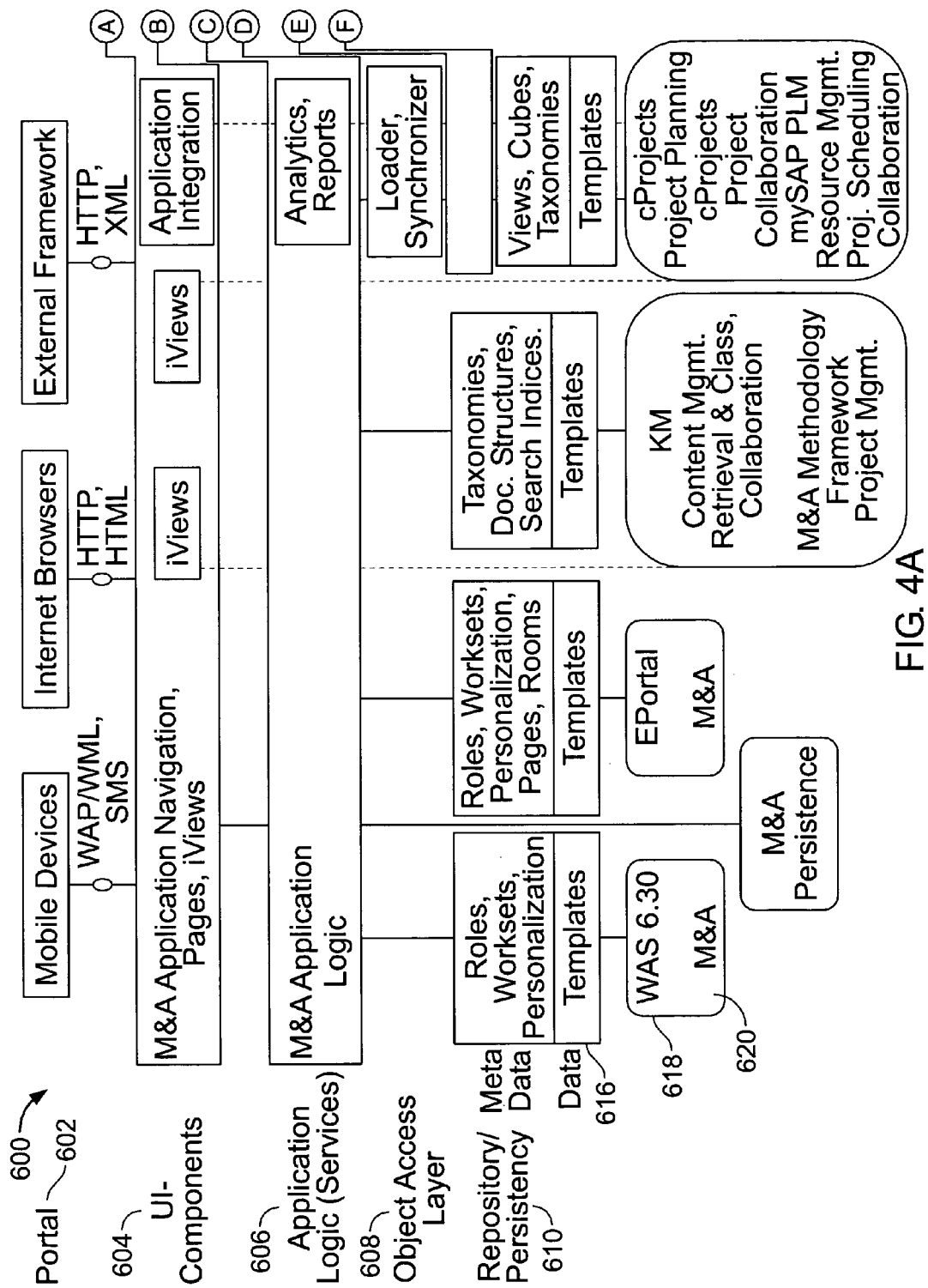
FIG. 4 is a block diagram of a platform.
Figure 4B:
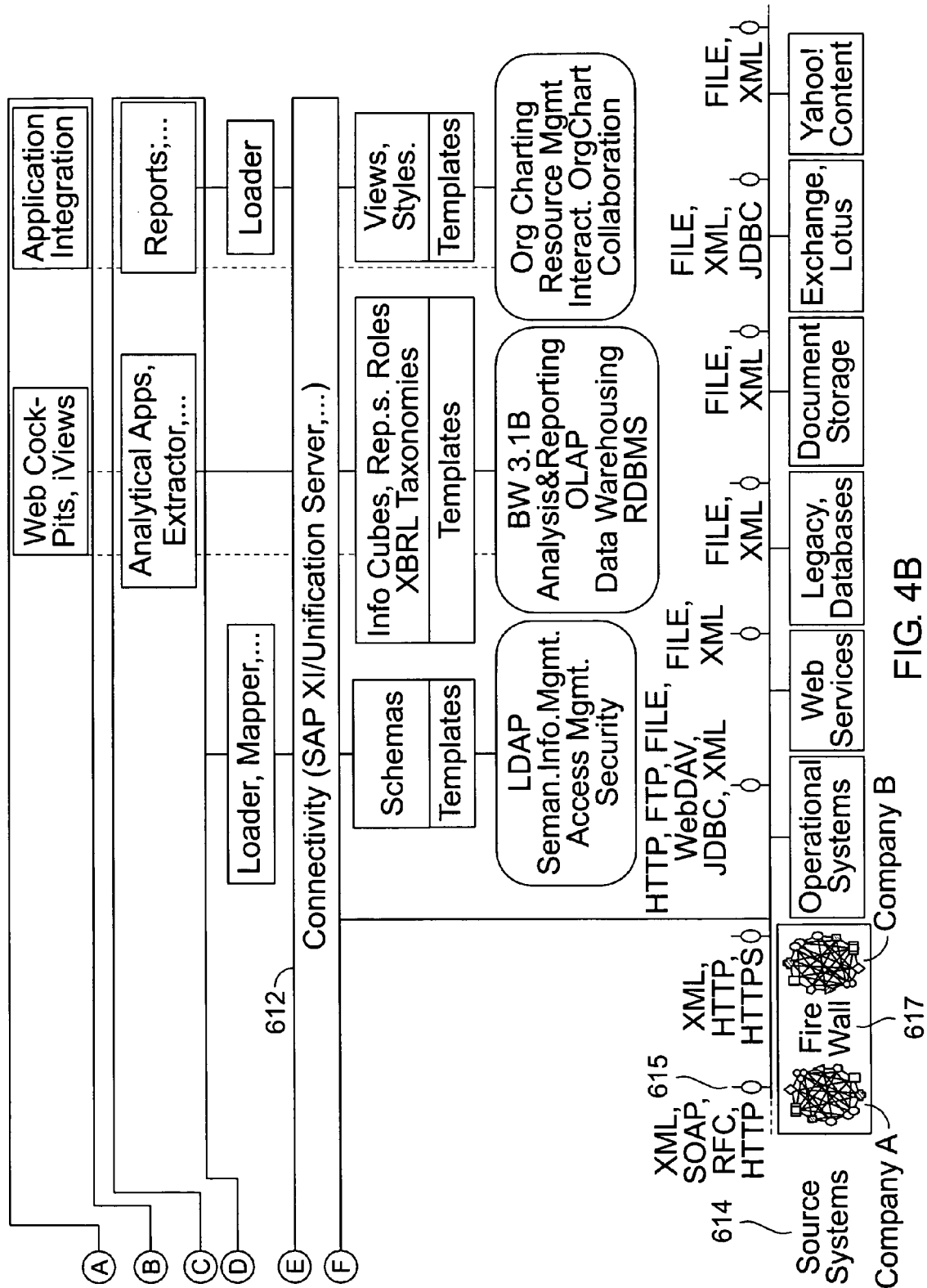

As shown in FIG. 4, a platform 600 that supports the architecture 500 includes a portal 602, user interface (UI) components 604 and application services logic 606. The platform 600 includes an object access layer 608, a persistence/repository layer 610, connectivity layer 612, and source systems 614. In embodiments, the architecture includes software and components from SAP AG of Germany, as well as special corporate restructuring modules.

Graphical user interfaces (GUIs) provide interaction between a user and the UI components 604 through the portal 602. The UI components 604 interact with the application services logic 606. The application services logic 606 interact with databases and repositories in the persistence/repository layer 610. The user requests information via a GUI through the portal 602. The application services logic 606 processes the user request, retrieves the appropriate requested information from the databases and repositories in the persistence/repository layer 610, and sends the requested information to GUI for display to the user.

The databases and repositories in the persistence/repository layer 610 can contain metadata. Metadata refers to data that describes other data, such as data pertaining to roles, work sets and personalization information, for example. The metadata can interact with the object access layer 608, connectivity layer 612 and application services logic 606. The metadata can also interact with templates 616. The templates 616 provide a format or organization of information according to preset conditions. The templates 616 can interface with Web application server (WAS) processes 618 and core merger processes 620 in the repository layer 610.

In embodiments, the databases and repositories in the persistence/repository layer 610 interact with the source systems 614 through base system connectors 615 using a markup language such as extensible markup language (XML), web services such as Simple Object Access Protocol (SOAP), request for comments (RPC), or Transmission Control Protocol/Internet Protocol (TCP/IP). The source systems of one organization can interact with the source systems of another organization through a firewall 617.

The base system connectors 615 can include a enterprise connector (BC) interface, Internet communication manager/Internet communications framework (ICM/ICF), an encapsulated postscript (EPS) interface and/or other interfaces that provide remote function call (RFC) capability.

The persistence/repository layer 610 provides the platform 600 with its own database and data object model. The database and data object model provides a consolidated knowledge base to support multiple enterprise functions, including functions generated as cross-applications. Active communication between the persistence/repository layer 610 and the base systems 516/614 provides a linkage between real time relational data from multiple base systems 516/614 and an integrated enterprise tool to permit strategic enterprise management and planning.

The data object model represents a subset of data objects managed by base systems 516/614. Not all of the data aspects tracked in the base systems 516/614 need to be recorded in the data object model. The data object model has defined relationships with data objects stored in the base systems 516/614. For example, certain data objects in the data object model have "read-only" or "write-only" relationships with data objects in the base systems 516/614. These types of defined relationships are enforced through a communication process between the persistence/repository layer 610 and the base systems 516/614. The persistence/repository layer 610 decouples application development from the underlying base systems 516/614.

In embodiments, the source systems 516/614 interact with third party applications, such as Lotus software from IBM or data provided by other content providers, such as Yahoo! As described above, the portal 602 provides a common interface to management services. The management services include a merger project management service and a merger integration project management service. The network 504 links the clients 502 to the portal 602 for exchange of information pertaining to a merger of two organization organizations or an acquisition involving two organizations.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A computer program may be a collection of instructions and/or definitions that describe a task or set of tasks to be carried out by a computer.

Computer readable media may be any sort of physical device that can store data and be read by a computer, including but not limited to CDs, DVDs, ROM, RAM, Hard Disks, and Flash Memory Drives.

Other embodiments are within the scope of the following claims.

What is claimed is:

1. A computer program residing on a non-transitory computer readable medium having a plurality of instructions, which, when executed by a processor, cause the processor to perform operations comprising:

connecting a portal to one or more user interface (UI) components;

linking one or more interface (UI) components to a repository layer including databases and a connectivity layer through an object access layer, the repository layer including metadata pertaining to roles, work sets and personalization information, the metadata configured to interact with at least one template, the at least one template providing a format of information according to preset conditions, the at least one template configured to interact with Web application server (WAS) processes and core restructuring processes;

linking the repository layer and the connectivity layer to source systems, the databases of the repository layer configured to interact with the source systems through base system connectors using web services, the web services including simple object access protocol, the base system connectors including an encapsulated postscript interface;

accessing a database that includes data representing multiple enterprise functions, wherein the data representing multiple enterprise functions includes personal tasks and resources for users; and using one or more object modeling tools, one or more process modeling tool, and the one or more UI component to build components of cross-functional applications from the data representing multiple enterprise functions, wherein the cross-functional applications include pages that display the personal tasks and resources for users;

wherein the repository layer comprises: a data object model; and the databases of the repository layer including metadata and data, the data including templates.

2. The computer program of claim 1 further comprising input/output (I/O) devices linked to the portal.

3. The computer program of claim 2 in which the I/O devices are web devices that communicate with the portal using Wireless Application Protocol (WAP) and Wireless Markup Language (WML).

4. The computer program of claim 2 in which the I/O devices are Internet browsers that communicate with the portal using Hypertext Transfer Protocol (HTTP) and Extended Markup Language (XML).

5. The computer program of claim 1 in which the portal is a common interface that receives requests from clients and generates information views (iViews) in response.

6. The computer program of claim 5 in which the iViews are web pages.

7. The computer program of claim 5 in which the client requests are coupled to the portal by a proxy server.

8. The computer program of claim 1 in which the UI components comprise: application navigation components; application integration components; and information views.

9. The computer program of claim 1 in which the metadata interacts with the object access layer, the connectivity layer and the application logic.

10. The computer program of claim 1 in which the databases interact with the source systems through the base system connectors using a markup language.

11. The computer program of claim 1 in which the databases interact with the source systems through the base system connectors using transmission control protocol/Internet protocol (TCP/IP).

12. The computer program of claim 1 in which source systems communicate with each other through a firewall.

13. The computer program of claim 1 wherein the base system connectors further include an enterprise connector interface.

* * * * *